US010817564B1

(12) United States Patent
Harris et al.

(10) Patent No.: US 10,817,564 B1
(45) Date of Patent: Oct. 27, 2020

(54) CONTENT CREATOR FEED GENERATION

(71) Applicant: Facebook, Inc., Menlo Park, CA (US)

(72) Inventors: David Abraham Harris, San Francisco, CA (US); Michael David Revow, Bellevue, WA (US); Jeffrey Chien, Sunnyvale, CA (US); John Cotant Christensen, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 136 days.

(21) Appl. No.: 16/040,678

(22) Filed: Jul. 20, 2018

(51) Int. Cl.
*G06F 7/00* (2006.01)
*G06F 16/738* (2019.01)
*G06F 16/735* (2019.01)
*G06F 16/9535* (2019.01)
*G06F 16/2457* (2019.01)

(52) U.S. Cl.
CPC ...... *G06F 16/738* (2019.01); *G06F 16/24578* (2019.01); *G06F 16/735* (2019.01); *G06F 16/9535* (2019.01)

(58) Field of Classification Search
CPC ............... H06F 16/738; G06F 16/9535; G06F 16/24578; G06F 16/735
USPC .................................................. 707/600–899
See application file for complete search history.

(56) References Cited

U.S. PATENT DOCUMENTS

2018/0052851 A1* 2/2018 Lewis ................ H04N 21/8456

* cited by examiner

*Primary Examiner* — Isaac M Woo
(74) *Attorney, Agent, or Firm* — Fenwick & West LLP (57) ABSTRACT

An online system maintains a plurality of content items for presentation to users in one or more feeds of content items, the users including a plurality of content creators providing content items for presentation. The online system identifies a first set of content items provided by a content creator. The online system identifies a viewing set of users who viewed one or more content items in the first set of content items. The online system identifies a second set of content items provided by other content creators and viewed by the viewing set of users. The online system ranks the second set of content items and generates a feed of content items for the content creator including the ranked content items. The online system provides the generated feed for presentation.

20 Claims, 4 Drawing Sheets

CONTENT CREATOR FEED GENERATION

BACKGROUND

This disclosure relates generally to generating a feed of content items for presentation to a user of an online system.

Online systems, such as social networking systems, allow users to connect to and to communicate with other users of the online system. Users may create profiles on an online system that are tied to their identities and include information about the users, such as interests and demographic information. The users may be individuals or entities, such as corporations or charities. Online systems allow users to easily communicate and share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Online systems also enable users to create original content and share it with other users of the system. These users are known as content creators who create content items for presentation to other users of the online system. Users of online systems who view created content items typically prefer certain types of content over others and content creators may find inspiration for future content creations by other content items presented to them by the online system. However, content items presented to a content creator are typically content items determined by the online system to be preferable for the content creator rather than preferable to users of the online system who view the content creator's content items. As such, content items that inspire content creators may not reflect the desires of users who view the content creator's content items.

SUMMARY

An online system provides an inspiration newsfeed containing content that may operate as a representative of content that a content creator's audience is likely to find interesting and engage with to educate and inspire content creators to produce content that is more interesting or relevant to their audience on the system. Accordingly, in one embodiment, an online system maintains a plurality of content items for presentation to users of the online system in one or more feeds of content items. Users, including a plurality of content creators, provide these content items for presentation to other users within the online system. The online system identifies a first set of content items provided by a content creator. The online system identifies a viewing set of users who viewed one or more content items in the first set of content items. The online system identifies a second set of content items provided by other content creators and viewed by the viewing set of users. The online system ranks the second set of content items and generates a feed of content items for the content creator including the ranked second set of content items. The online system provides the generated feed for presentation to the content creator. The online system may generate additional feeds of content items, depending upon the embodiment. Various techniques to rank content items may be used in various embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
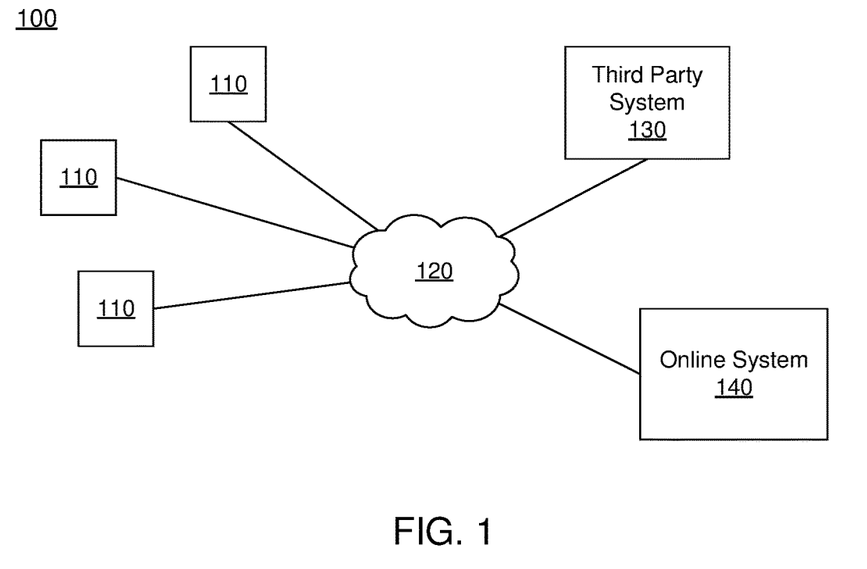
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as content or information about an application provided by the third party system 130.

Figure 2:
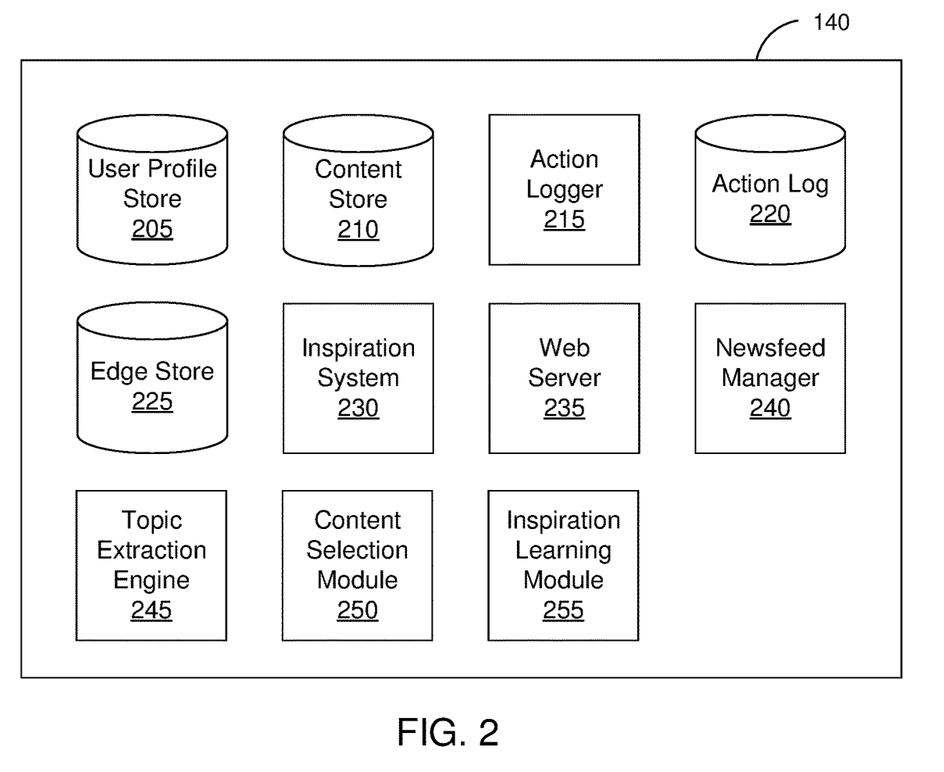
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an inspiration system 230, a web server 235, a newsfeed manager 240, a topic extraction engine 245, a content selection module 250, and an inspiration learning module 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

Some users of the online system 140 are content creators. A content creator, in one embodiment, is a user of the online system 140 with an aggregate watch time equal to or surpassing a threshold aggregate watch time, and/or an aggregate watch time equal to or surpassing a threshold percentile of aggregate watch times. In an embodiment, aggregate watch time is a metric based on a number of viewers of content items created by the content creator multiplied by an average amount of time spent viewing the created content items. For example, if 100 viewers view a content item for 10 minutes, the aggregate watch time is 1000. The threshold aggregate watch time may be an aggregate watch time of 1,000,000, for example, or any other positive value. Similarly, the threshold percentile of aggregate watch times may be, for example, 75, in which case a user of the online system 140 is a content creator if the user's aggregate watch time reaches or surpasses at least the 75th percentile of all aggregate watch times. In an embodiment, a group of users may be considered a content creator if the group creates content items together. For example, if the group of users share a user profile that they use to share content items.

While user profiles in the user profile store 205 are frequently associated with individuals or groups thereof, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In an embodiment, content creators cannot be businesses or certain organizations. For example, a fast food restaurant user profile and an international charity's user profile may not be considered user profiles that can be content creators, though a user profile associated with a group of friends who like to skateboard may be considered a user profile that can be a content creator.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), following a content creator's user profile, and engaging in a transaction. In some embodiments, data from the action log 220 is used to infer interests or preferences of a user, augmenting the interests included in the user's user profile and allowing a more complete understanding of user preferences. In an embodiment, some users of the online system 140 are "followers" of a content creator such that the users are notified whenever the content creator creates new content (e.g., the content creator's user profile shares a new content item). The action log 220 may track whenever a user follows or terminates following a content creator's user profile.

The action log 220 may also store user actions taken on a third party system 130, such as an external website, and communicated to the online system 140. Because users of the online system 140 are distinguishable from one another, third party websites may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

Figure 3:
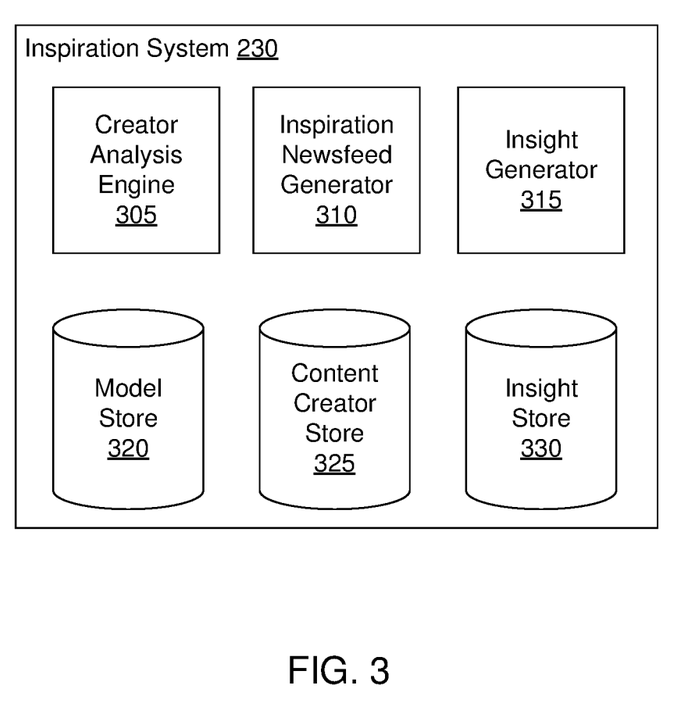
FIG. 3 is a block diagram of an inspiration system, in accordance with an embodiment.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user, e.g. using affinities in collaborative filtering to determine whether a user would be interested in a content item created by a content creator. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users. Depending upon the embodiment, affinities of users following a content creator are stored in association with the content creator in the edge store 225 and/or in the content creator store 325 as detailed below with reference to the inspiration system 230.

The inspiration system 230 generates inspiration feeds for presentation to content creators. The inspiration system 230 includes a creator analysis engine 305, an inspiration newsfeed generator 310, an insight generator 315, a model store 320, a content creator store 325, and an insight store 330. Depending upon the embodiment, the inspiration system 230 may perform additional or other functions and include additional or other components. The inspiration system 230 is further detailed below with respect to FIG. 3.

In one embodiment, the online system 140 identifies stories likely to be of interest to a user through one or more "newsfeeds" presented to the user. A story presented to a user describes an action taken by an additional user connected to the user and identifies the additional user. For example, if a content creator shares a new content item, newsfeeds of followers of the content creator may include the new content item. In some embodiments, a story describing an action performed by a user may be accessible to users not connected to the user that performed the action. For example, if a follower of a content creator shares a new content item created by the content creator, newsfeeds of users connected to the follower but not the content creator may include the new content item. The newsfeed manager 240 may generate stories for presentation to a user based on information in the action log 220 and in the edge store 225 or may select candidate stories included in the content store 210. One or more of the candidate stories are selected and presented to a user by the newsfeed manager 240. In some embodiments the newsfeed manager 240 operates in conjunction with the inspiration newsfeed generator 310 as detailed below with reference to the inspiration system 230. As such, reference to the newsfeed manager 240 may further apply to the inspiration newsfeed generator 310, and/or vice versa, depending upon the embodiment.

As an example, the newsfeed manager 240 receives a request to present one or more stories to an online system user. The newsfeed manager 240 accesses one or more of the user profile store 105, the content store 110, the action log 120, the edge store 125, and the content creator store 325 to retrieve information about the identified user. For example, stories or other data associated with users connected to the identified user, e.g. content items created by content creators the identified user follows, are retrieved. The retrieved stories or other data are analyzed by the newsfeed manager 240 to identify candidate content items, which include content having at least a threshold likelihood of being relevant to the user. For example, stories associated with users not connected to the identified user or stories associated with users for which the identified user has less than a threshold affinity are discarded as candidate stories. Based on various criteria, the newsfeed manager 240 selects one or more of the candidate stories for presentation to the identified user.

In various embodiments, the newsfeed manager 240 presents stories to a user through a newsfeed including a plurality of stories selected for presentation to the user. The newsfeed may include a limited number of stories or may include a complete set of candidate stories. The number of stories included in a newsfeed may be determined in part by a user preference included in user profile store 105. The newsfeed manager 240 may also determine the order in which selected stories are presented via the newsfeed. For example, the newsfeed manager 240 determines that a user has a highest affinity for a specific content creator or other user and increases the number of stories in the newsfeed associated with the specific content creator or other user or modifies the positions in the newsfeed where stories associated with the specific content creator or other user are presented.

The newsfeed manager 240 may also account for actions by a user indicating a preference for types of stories and selects stories having the same, or similar, types for inclusion in the newsfeed. Additionally, the newsfeed manager 240 may analyze stories received by the online system 140 from various users to obtain information about user preferences or actions from the analyzed stories. This information may be used to refine subsequent selection of stories for newsfeeds presented to various users. This information may be communicated to the creator analysis engine 305, inspiration newsfeed generator 310, and/or insight generator 315 for use in generating inspiration newsfeeds 310, as detailed below with reference to the inspiration system 230.

The online system 140 includes a topic extraction engine 245, which identifies one or more topics associated with objects in the content store 210. To identify topics associated with content items, the topic extraction engine 245 identifies anchor terms included in a content item and determines a meaning of the anchor terms as further described in U.S. patent application Ser. No. 13/167,701, filed Jun. 24, 2011, which is hereby incorporated by reference in its entirety. For example, the topic extraction engine 245 determines one or more topics associated with a content item maintained in the content store 210. The one or more topics associated with a content item are stored and associated with an object identifier corresponding to the content item. In various embodiments, associations between object identifiers and topics are stored in the topic extraction engine 245 or in the content store 210 to simplify retrieval of one or more topics associated with an object identifier or retrieval of object identifiers associated with a specified topic. Structured information associated with a content item may also be used to extract a topic associated with the content item.

The content selection module 250 selects one or more content items for communication to a client device 110 to be presented to a user. Content items eligible for presentation to the user are retrieved from the content store 210 or from another source by the content selection module 250, which selects one or more of the content items for presentation to the viewing user. A content item eligible for presentation to the user is a content item associated with at least a threshold number of targeting criteria satisfied by characteristics of the user or is a content item that is not associated with targeting criteria. Alternatively, in some embodiments, the content selection module 250 selects content items for content creators based on the content items viewed by users that view content items created by the content creator or that follow the content creator, as detailed below with reference to the inspiration system 230.

In various embodiments, the content selection module 250 includes content items eligible for presentation to the user in one or more selection processes, which identify a set of content items for presentation to the user. For example, the content selection module 250 determines measures of relevance of various content items to the user based on characteristics associated with the user by the online system 140 and based on the user's affinity for different content items. Based on the measures of relevance, the content selection module 250 selects content items for presentation to the user. As an additional example, the content selection module 250 selects content items having the highest measures of relevance or having at least a threshold measure of relevance for presentation to the user. Alternatively, the content selection module 250 ranks content items based on their associated measures of relevance and selects content items having the highest positions in the ranking or having at least a threshold position in the ranking for presentation to the user.

In some embodiments the content selection module 250 includes content items eligible for presentation to a content creator in one or more inspiration selection processes, which identify a set of content items for presentation to the content creator. For example, the content selection module 250 determines measures of relevance of various content items to the content creator based on characteristics associated with users who view content items created by the content creator. Based on the measures of relevance, the content selection module 250 selects content items for presentation to the content creator. In various embodiments the measures of relevance may be further or alternatively determined based on an amount of overlap between viewers of the content items and viewers of content items created by the content creator, based on a measure of popularity of the content items in a region or for a topic, based on a similarity of number of followers between the content creator and the other content creators who created the content items, based on an amount of over-performance of the content item, based on a measure of similarity between the content creator and the other content creators who created the content items, based on a strategic value of the content items, based on an educational value of the content items, and so on. Depending upon the embodiment, the content selection module 250 may operate in conjunction with the inspiration system 230 to select content items for content creators, e.g. for inclusion in an inspiration newsfeed. Selection of content items for content creators is further detailed below with respect to the inspiration system 230.

In various embodiments, the content selection module 250 presents content to a user through one or more newsfeeds including a plurality of content items selected for presentation to the user. The content selection module 250 may also determine the order in which selected content items are presented via the newsfeed. For example, the content selection module 230 orders content items in the newsfeed based on likelihoods of the user interacting with various content items.

The inspiration learning module 255 applies machine learning techniques to generate an inspiration model that when applied to content items outputs indications of whether the content items are suitable for presentation to a content creator in a content creator newsfeed, such as a representative probability or Boolean value. Inspiration models may be generalized such that they may be used for various content creators and content items, or may be more specific, e.g. for a particular content creator or a particular content item. In some embodiments inspiration models are stored in the model store 370.

As part of the generation of the inspiration model, the inspiration learning module 255 forms a training set of content items by identifying a positive training set of content items and corresponding users where the content items have been determined to be suitable for presentation to the corresponding users, and, in some embodiments, forms a negative training set of content items and corresponding users where the content items have been determined to not be suitable for presentation to the corresponding users. In various embodiments, some or all of the corresponding users are content creators.

The inspiration learning module 255 extracts feature values from the content items and corresponding users of the training set, the features being variables deemed potentially relevant to whether the content items are suitable for presentation to the corresponding user. Specifically, the feature values extracted by the inspiration learning module 255 for a given content item-corresponding user pair can include a topic, a region, an audience size, and a viewing user overlap. An ordered list of the features for a content item is herein referred to as the feature vector for the content item. In one embodiment, the inspiration learning module 255 applies dimensionality reduction (e.g., via linear discriminant analysis (LDA), principle component analysis (PCA), or the like) to reduce the amount of data in the feature vectors for content items to a smaller, more representative set of data.

The inspiration learning module 255 uses supervised machine learning to train the inspiration model, with the feature vectors of the positive training set and the negative training set serving as the inputs. Alternatively, in other embodiments, semi-supervised or unsupervised techniques are used. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The inspiration model, when applied to the feature vector extracted from a content item, outputs an indication of whether the content item is suitable for presentation to a content creator, such as a Boolean yes/no estimate, or a scalar value representing a probability.

In some embodiments, a validation set is formed of additional content items and corresponding users, other than those in the training sets, which have already been determined to have or to lack suitability for presentation. The inspiration learning module 255 applies the trained validation inspiration model to the content items of the validation set to quantify the accuracy of the inspiration model. Common metrics applied in accuracy measurement include: Precision=TP/(TP+FP) and Recall=TP/(TP+FN), where precision is how many the inspiration model correctly predicted (TP or true positives) out of the total it predicted (TP+FP or false positives), and recall is how many the inspiration model 255 correctly predicted (TP) out of the total number of content items that determined to be suitable for presentation (TP+FN or false negatives). The F score (F-score=2*PR/(P+R)) unifies precision and recall into a single measure. In one embodiment, the inspiration learning module 255 iteratively re-trains the inspiration model until the occurrence of a stopping condition, such as the accuracy measurement indication that the model is sufficiently accurate, or a number of training rounds having taken place.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Inspiration System 230

FIG. 3 is a block diagram of the inspiration system 230, in accordance with an embodiment. The inspiration system 230 includes the creator analysis engine 305, the inspiration newsfeed generator 310, the insight generator 315, the model store 320, the content creator store 325, and the insight store 330.

In various embodiments the creator analysis engine 305 analyzes content items created by content creators as well as the content creators themselves, followers of the content creators, and/or viewing users of the content items created by the content creators. Depending upon the embodiment the creator analysis engine 305 operates in conjunction with the topic extraction engine 245, content selection module 250, inspiration module 255, and/or the other components of the inspiration system 230 to analyze content items, content creators, followers, and/or viewing users. In various embodiments the creator analysis engine 305 uses inspiration models trained by the inspiration learning module 255 to perform analyses. The inspiration models may be stored in the model store 320.

The creator analysis engine 305 analyzes users of the online system 140 to determine whether the users are content creators. Specifically, the creator analysis engine 305 identifies content items created by a user and determines an aggregate watch time measurement for the user. If the aggregate watch time measurement reaches or exceeds a threshold aggregate watch time, or if the aggregate watch time measurement reaches or exceeds a threshold percentile aggregate watch time, the creator analysis engine 305 categorizes the user as a content creator.

The creator analysis engine 305 analyzes content items, viewing users of content items, and followers of content creators to identify content items that are suitable for presentation to a particular content creator in an inspiration newsfeed, as detailed below. The suitability of a content item for presentation to a content creator may depend upon the embodiment, and may involve an affinity score and/or one or more additional factors as detailed below.

The creator analysis engine 305 may identify a content item as suitable for presentation to a particular content creator if a set of users who viewed the content item reaches or surpasses a threshold amount of overlap with a set of users who viewed one or more content items created by the particular content creator. The threshold amount of overlap may be a percentage of users or a number of viewers. For example, the threshold amount of overlap may be 1000 viewers such that a certain content item viewed by 1000 users that also viewed one or more content items created by the particular content creator is identified as suitable, regardless of how many other viewers of the certain content item did not view one or more other content items created by the particular content creator. Alternatively, the threshold amount of overlap could be 50%, such that if 50% of the viewers of the certain content item also viewed one or more content items created by the particular content creator, the certain content item is identified as suitable.

The creator analysis engine 305 may identify a content item as suitable for presentation to a particular content creator if the content item is a top content item for competitor content creator. A competitor content creator is a content creator with at least a threshold amount of overlap between sets of viewing users with the particular content creator. For example, if the particular content creator and an additional content creator each create certain content items, and half of the viewing users that view the each of the certain content items are the same, the additional content creator may be considered to be a competitor content creator for the particular content creator. A top content item of a content creator is a content item that has reached or surpassed one or more metrics for content items of the content creator, or is within a threshold ranking for content items as ranked by the one or more metrics. For example, a content item created by a content creator may be considered a top content item for the content creator if it is one of the ten most-viewed content items created by the content creator.

The creator analysis engine 305 may identify a content item as suitable for presentation to a particular content creator if the content item is a top overall content item. A content item is a top overall content item if it has reached or surpassed one or more metrics for content items in the online system 140, or is within a threshold ranking for content items as ranked by the one or more metrics. For example, if a content item is within the top 100 most-viewed content items within the online system 140, the content item may be considered to be a top overall content item. In an embodiment, the creator analysis engine 305 identifies a content item as suitable for presentation to a particular content creator if the content item is a top overall content item within a particular topic rather than for the online system overall (i.e., for all topics). The particular topic may be based on a topic associated with the content creator. For example, if the content creator is associated with "skateboarding" as its topic, and a content item is identified as within the top 10 most-viewed content items pertaining to "skateboarding," the content item may be identified as suitable for presentation to the particular content creator.

The creator analysis engine 305 may identify a content item as suitable for presentation to a particular content creator if the content item is over-performing by a threshold amount. Over-performance of a content item may be determined as a function of a measurement of a metric for the content item as compared with a historic average of measurements of the metric for other content items created by the content creator who created the content item. For example, if the content item has 30,000 views and historically content items of the content creator average 1,000 views, the content item is over-performing thirtyfold. If the threshold amount of over-performance is, for example, tenfold, the content item is identified as suitable for presentation to the particular content creator.

The creator analysis engine 305 may identify a content item as suitable for presentation to a particular content creator if the content item is a top overall content item within one or more particular demographics of the content creator, followers of the content creator, and/or viewing users of content items created by the content creator. For example, if a majority of the content creator's viewing users are in the United States, and the content item is one of the top ten most viewed content items in the United States, the content item may be identified as suitable. As another example, if the content creator is a man in his thirties, and the content item is within the top ten most-shared content items among men in their thirties, the content item may be identified as suitable for presentation to the content creator.

The creator analysis engine 305 may identify a content item as suitable for presentation to a particular content creator if the content item is labeled as a strategic content item. A strategic content item is a content item that provides a content creation benefit to the content creator, such as a tutorial on how to use a certain content creation tool.

The creator analysis engine 305 may identify a content item as suitable for presentation to a particular content creator if the content item is associated with a set of viewing users that has at least a threshold amount of overlap with a set of viewing users of one or more content items viewed by the particular content creator.

The inspiration newsfeed generator 310 generates inspiration newsfeeds for content creators using one or more content items identified as suitable by the creator analysis engine 305. Depending upon the embodiment, the inspiration newsfeed generator 310 operates in conjunction with the newsfeed manager 240 to generate inspiration newsfeeds, and may use some or all of the functionality of the newsfeed manager 240. In an embodiment, the inspiration newsfeed generator 310 associates an insight with each content item in a generated inspiration newsfeed for presentation along with the content item within the generated inspiration newsfeed. For example, the inspiration newsfeed generator 310 communicates a set of content items to the insight generator 315, e.g. a set of content items that are included in a generated inspiration newsfeed. The inspiration newsfeed generator 310 may then receive one or more insights each associated with a content item in the set of content items from the insight generator 315. The inspiration newsfeed generator 310 may store inspiration newsfeeds for content creators in the content creator store 325 in association with the content creators.

The insight generator 315 generates one or more insights for a content item. For example, if the insight generator 315 receives a set of content items from the inspiration newsfeed generator 310, the insight generator 315 generates one or more insights for each content item in the set. In another embodiment, the insight generator 315 generates one or more insights for each content item identified by the creator analysis engine 305. The insight generator 315 sends insights to the inspiration newsfeed generator 310 for inclusion in inspiration newsfeeds. Furthermore, the insight generator 315 may store insights in the insight store 330.

An insight, in one embodiment, is a reason for inclusion of a content item in an inspiration newsfeed for a content creator. In an embodiment the insight is represented within the inspiration newsfeed as a textual label upon or adjacent to the content item. In an embodiment, the reason for inclusion of the content item is the reason the creator analysis engine 305 identified the content item as suitable for the content creator. For example, if the content item is identified as suitable because it is over-performing, the insight may be "this content item is over-performing." Insights may also be results of meta-analyses of content items, e.g. by the creator analysis engine 305. For example, an insight may be "captions increase view time by 10%" if the creator analysis engine 305 determines that, on average, content items with captions are viewed by viewing users 10% longer than content items without captions.

In some embodiments some or all insights may be dynamic, where the insights include not only the reason for inclusion but also particularities of the reason for inclusion. For example, if the content item is the second most viewed content item for "a skateboarding" topic for a 24 hour period, the insight may be "this content item is the second most viewed skateboarding content item today." As a second example, if the content item over-performs thirtyfold, the dynamic insight may be "this content item is over-performing by 30×."

The model store 320 is a database that stores inspiration models. The content creator store 325 is a database that stores user profiles of content creators, records followers of content creators, viewing users of content items created by content creators, and/or generated inspiration newsfeeds for content creators, in various embodiments. The insight store 330 stores insights in association with content items, in some embodiments.

Exemplary Inspiration Feed

Figure 4:
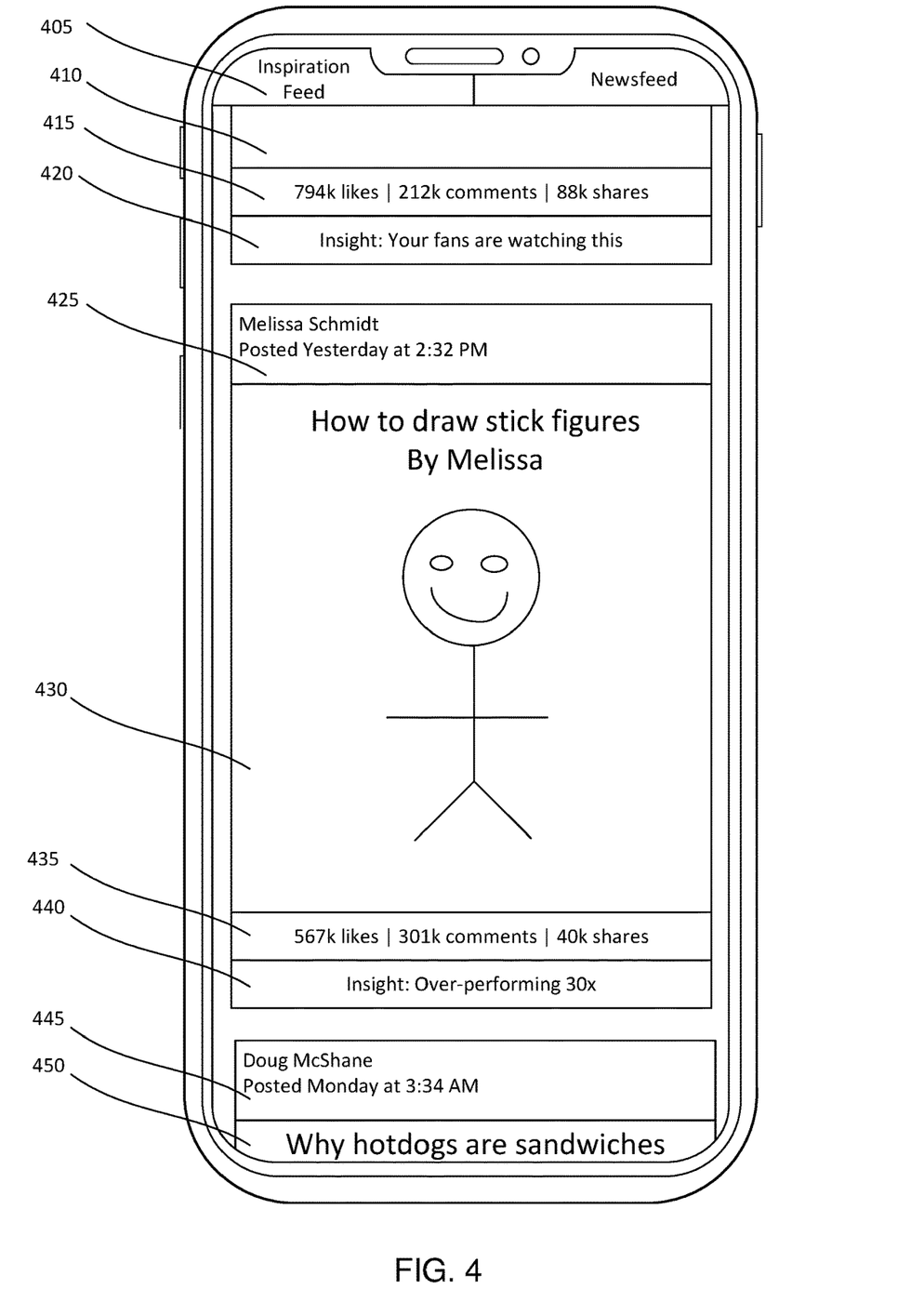
FIG. 4 is a simplified example of a user interface, in accordance with an embodiment.

FIG. 4 is a simplified example of a user interface, in accordance with an embodiment. In this example, the user interface includes an inspiration newsfeed displayed upon the display of a mobile computing device, which is a client device 110. The user interface includes an "Inspiration Feed" tab 405 as well as a "Newsfeed" tab situated at the top of the display. Upon selection of the Inspiration Feed tab 405, the user interface adjusts to include an inspiration newsfeed, while selection of the Newsfeed tab causes the user interface to adjust to include a newsfeed. For example, the newsfeed may include content items selected by the content selection module 250, while the inspiration newsfeed may include content items identified by the creator analysis engine 305 and/or included in the inspiration newsfeed by the inspiration newsfeed generator 310. As a specific example, the inspiration newsfeed may include a content item that is over-performing and that is relevant to a topic associated with the content creator, while the newsfeed may include a content item relevant to a friend of the content creator, e.g. a photo from a vacation.

Content item 430 includes a picture of a stick figure and a title "How to draw stick figures By Melissa." The content item 430 is associated with content creator information 425 such as the content creator's name "Melissa Schmidt" and a time of sharing "Posted Yesterday at 2:32 PM." Similarly, the content item is associated with interaction information 435, which in this example indicates a number of likes "567 k likes," a number of comments "301 k comments," and a number of shares "40 k shares." The content item 430 is also associated with an insight 440 "Insight: Over-performing 30×" indicating the content item 430 is over-performing thirtyfold. Depending upon the embodiment, each content item in the inspiration newsfeed may be associated with some or all of content creator information, interaction information, and an insight, and in some embodiments may be associated with additional or other information.

The inspiration newsfeed includes multiple content items. In an embodiment, the inspiration newsfeed scrolls across the display, e.g. upward and/or downward, to adjust such that it displays different content items. For example, a content item 410 associated with interaction information 415 and insight 420 may be moved fully into the display by scrolling the inspiration newsfeed. Similarly, a content item 450 with title "Why hotdogs are sandwiches" and associated with content creator information 445 "Doug McShane" and "Posted Monday at 3:34 AM" may be moved fully into the display by scrolling the inspiration newsfeed in another direction. The inspiration newsfeed may scroll, for example, in response to receipt of user interaction with the client device 110, e.g. at the user interface.

Inspiration Feed Generation

Figure 5:
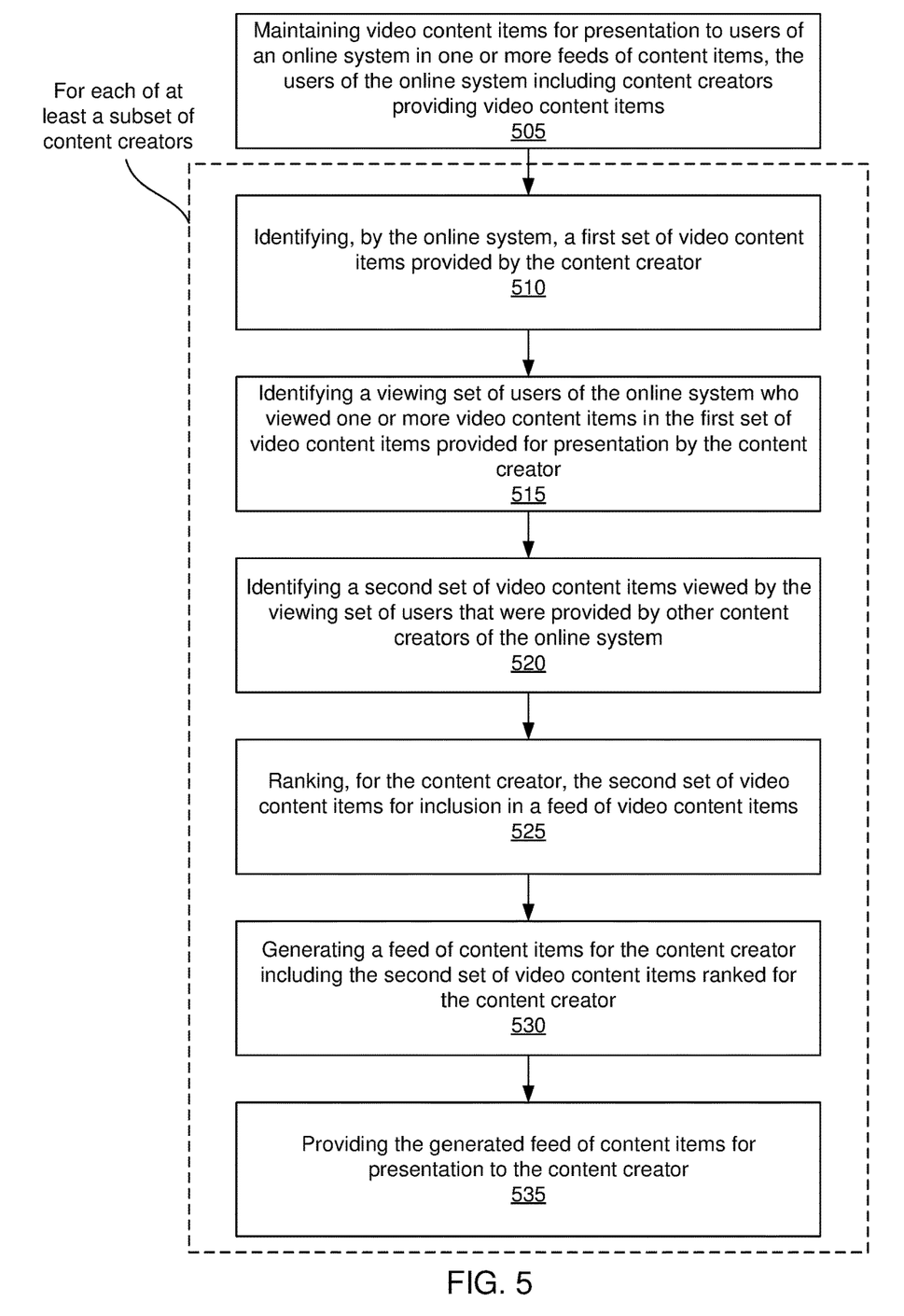
FIG. 5 is a flowchart of a method, in accordance with an embodiment.

FIG. 5 is a flowchart of a method, in accordance with an embodiment. The online system 140 maintains 505 video content items for presentation to users of the online system 140 in one or more feeds of content items. The users of the online system 140 include content creators that provide content items for presentation, e.g. video content items, which are referenced below for the rest of this example. In other embodiments other content items may be included, such as image content items or text string content items, or the provided content items may be of a plurality of types, e.g. both video content items and image content items.

For each of at least a subset of content creators, the online system 140 identifies 510 a first set of video content items provided by the content creator. The online system 140 identifies 515 a viewing set of users of the online system 140 who viewed one or more video content items in the first set of video content items provided for presentation by the content creator. The online system 140 identifies 520 a second set of video content items viewed by the viewing set of users that were provided by other content creators of the online system 140. For example, the creator analysis engine 305 uses an inspiration model to identify the second set of video content items. The online system 140 ranks 525 the second set of video content items for inclusion in a feed of video content items. For example, the feed may be an inspiration newsfeed. The online system 140 generates 530 a feed of content items for the content creator including the second set of video content items ranked for the content creator. The online system 140 provides 535 the generated feed of content items for presentation to the content creator. For example, the online system 140 sends the generated feed to a client device 110 associated with the content creator.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method, comprising:
maintaining, by an online system, a plurality of video content items for presentation to users of the online system in one or more feeds of content items, the users of the online system including a plurality of content creators providing video content items for presentation within the online system;
for each content creator of at least a subset of the plurality of content creators,
identifying, by the online system, a first set of video content items provided by the content creator;
identifying, by the online system, a viewing set of users of the online system who viewed one or more video content items in the first set of video content items provided for presentation by the content creator;
identifying, by the online system, a second set of video content items viewed by the viewing set of users that were provided by other content creators of the online system;
ranking, by the online system, for the content creator, the second set of video content items for inclusion in a feed of video content items;
generating, by the online system, a feed of content items for the content creator including the second set of video content items ranked for the content creator; and
providing, by the online system, the generated feed of content items for presentation to the content creator.

2. The method of claim 1, wherein ranking the video content items is optimized for preferences of the viewing set of users.

3. The method of claim 1, wherein each content creator is a user of the online system associated with at least one of an aggregate watch time equal to or surpassing a threshold aggregate watch time, and an aggregate watch time equal to or surpassing a threshold percentile of aggregate watch times for users of the online system.

4. The method of claim 1, wherein each video content item in the second set of video content items included in the generated feed of content items further comprises a textual insight indicating a reason for inclusion of the video content item in the second set of video content items.

5. The method of claim 1, further comprising:
for each of at least the subset of the plurality of content creators,
determining, by the online system, an additional set of content items for which the content creator has at least a threshold affinity;
generating, by the online system, an additional feed of content items for the content creator including the additional set of content items; and
providing, by the online system, the additional feed of content items for presentation to the content creator.

6. The method of claim 1, further comprising:
for each content creator,
identifying, by the online system, a third set of video content items, wherein each video content item in the third set of video content items is associated with a performance metric equal to or exceeding a threshold performance metric; and
ranking, by the online system, for the content creator, the third set of video content items for inclusion in the feed of video content items;
wherein the generated feed of content items for the content creator further includes the third set of video content items ranked for the content creator.

7. The method of claim 1, wherein ranking, for the content creator, the second set of video content items for inclusion in the feed of video content items is, for each video content item in the second set of video content items, based at least in part on at least one of collaborative filtering, a topic associated with the content creator, a demographic of the viewing set of users, an amount of overlap between viewers of the video content item and viewers of the first set of video content items, and an amount of viewers of the video content item that are followers of the content creator.

8. A method, comprising:
  maintaining, by an online system, a plurality of content items for presentation to users of the online system in one or more feeds of content items, the users of the online system including a plurality of content creators providing content items for presentation within the online system;
  identifying, by the online system, a viewing set of users of the online system who viewed a content item provided for presentation by a first content creator;
  identifying, by the online system, a set of content items viewed by the viewing set of users that were provided by one or more other content creators of the online system;
  generating, by the online system, a feed of content items for the first content creator including the set of content items viewed by the viewing set of users and that were provided by one or more other content creators of the online system; and
  providing, by the online system, the generated feed for presentation to the first content creator.

9. The method of claim 8, wherein ranking the content items is optimized for preferences of the viewing set of users.

10. The method of claim 8, wherein each content creator is a user of the online system associated with at least one of an aggregate watch time equal to or surpassing a threshold aggregate watch time, and an aggregate watch time equal to or surpassing a threshold percentile of aggregate watch times for users of the online system.

11. The method of claim 8, wherein at least a subset of the content items included in the generated feed of content items further comprises a textual insight indicating a reason for inclusion of the content item in the second set of content items.

12. The method of claim 8, further comprising:
  determining, by the online system, an additional set of content items for which the first content creator has at least a threshold affinity;
  generating, by the online system, an additional feed of content items for the first content creator including the additional set of content items; and
  providing, by the online system, the additional feed of content items for presentation to the first content creator.

13. The method of claim 8, further comprising:
  identifying, by the online system, a third set of content items, wherein each content item in the third set of content items is associated with a performance metric equal to or exceeding a threshold performance metric;
  ranking, by the online system, for the first content creator, the third set of content items for inclusion in the feed of content items, wherein the generated feed of content items for the first content creator further includes the third set of content items ranked for the content creator.

14. The method of claim 8, wherein ranking, for the first content creator, the second set of content items for inclusion in the feed of content items is, for each content item in the second set of content items, based at least in part on at least one of collaborative filtering, a topic associated with the first content creator, a demographic of the viewing set of users, an amount of overlap between viewers of the content item and viewers of the first set of content items, and an amount of viewers of the content item that are followers of the first content creator.

15. A non-transitory computer-readable storage medium storing computer program instructions executable by a processor to perform operations, the operations comprising:
  maintaining, by an online system, a plurality of content items for presentation to users of the online system in one or more feeds of content items, the users of the online system including a plurality of content creators providing content items for presentation within the online system;
  identifying, by the online system, a viewing set of users of the online system who viewed a content item provided for presentation by a first content creator;
  identifying, by the online system, a set of content items viewed by the viewing set of users that were provided by one or more other content creators of the online system;
  generating, by the online system, a feed of content items for the first content creator including the set of content items viewed by the viewing set of users and that were provided by one or more other content creators of the online system; and
  providing, by the online system, the generated feed for presentation to the first content creator.

16. The non-transitory computer-readable storage medium of claim 15, wherein ranking the content items is optimized for preferences of the viewing set of users.

17. The non-transitory computer-readable storage medium of claim 15, wherein each content creator is a user of the online system associated with at least one of an aggregate watch time equal to or surpassing a threshold aggregate watch time, and an aggregate watch time equal to or surpassing a threshold percentile of aggregate watch times for users of the online system.

18. The non-transitory computer-readable storage medium of claim 15, wherein at least a subset of the content items included in the generated feed of content items further comprises a textual insight indicating a reason for inclusion of the content item in the second set of content items.

19. The non-transitory computer-readable storage medium of claim 15, the operations further comprising:
  determining, by the online system, an additional set of content items for which the first content creator has at least a threshold affinity;
  generating, by the online system, an additional feed of content items for the first content creator including the additional set of content items; and
  providing, by the online system, the additional feed of content items for presentation to the first content creator.

20. The non-transitory computer-readable storage medium of claim 15, the operations further comprising:
  identifying, by the online system, a third set of content items, wherein each content item in the third set of content items is associated with a performance metric equal to or exceeding a threshold performance metric;
  ranking, by the online system, for the first content creator, the third set of content items for inclusion in the feed of content items, wherein the generated feed of content items for the first content creator further includes the third set of content items ranked for the content creator.

* * * * *